Nov. 20, 1962   M. FRITZ   3,064,496
CRANKSHAFT CONSTRUCTION
Filed April 20, 1959
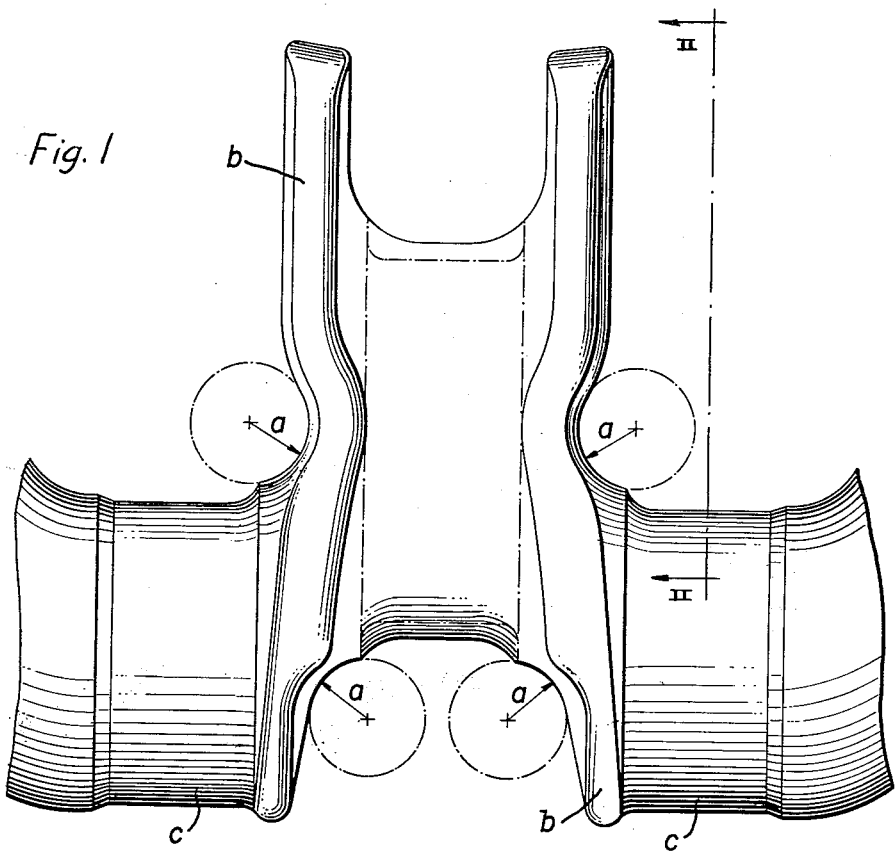
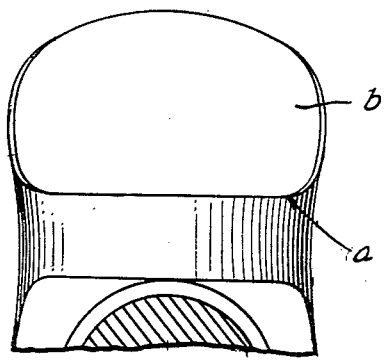
INVENTOR.
MARTIN FRITZ
BY
Dicke, Craig and Freudenberg
ATTORNEYS United States Patent Office 3,064,496
Patented Nov. 20, 1962

3,064,496
CRANKSHAFT CONSTRUCTION
Martin Fritz, Oberurbach, Kreis Waiblingen, Germany, assignor to Daimler-Benz Aktiengesellschaft, Stuttgart-Unterturkheim, Germany
Filed Apr. 20, 1959, Ser. No. 807,370
Claims priority, application Germany Apr. 24, 1958
4 Claims. (Cl. 74—596)

The present invention relates to a crankshaft construction, and more particularly to a forged crankshaft construction for internal combustion engines, especially to a multi-throw crankshaft construction which may be readily manufactured by forging operations.

It is already known in the prior art in connection with cast crankshafts for internal combustion engines to guide the flow of forces in the crankshaft at the transition places between the cheeks and the bearing pins normally endangered by possible notch crevices or cracks along a relatively long arcuate path in order to arrange more evenly the flow of forces within the areas or portions of the crankshaft materials normally endangered by stress concentrations. In these cast prior art crankshaft constructions, trough-shaped recesses, so called "relief pockets," are arranged at these transition places whereby the manufacture of these trough-shaped recesses or "relief pockets" encountered no particular difficulties in connection with the casting operation of the crankshaft by reason of the possibility of making the mold used in connection with the casting of appropriate shape. Similarly, to date, in the prior art constructions using forging techniques, such trough-shaped recesses or relief pockets had to be carefully machined or milled out of the crankshaft in connection with forged crankshafts. The machining operations thereby considerably increased the cost of manufacture of forged crankshafts.

The present invention, in contrast thereto, proposes to provide, in the place of the usual relief pockets used in the prior art, depressions or recessed portions which extend in a continuous manner, i.e., depressions or recessed portions which extend continuously through or along the crankshaft cheeks perpendicularly to the crankshaft axis, and particularly which possess a rectilinear axis and provide wall surfaces of continuously curved cross section, and which furthermore have the same effect as the aforementioned relief pockets but which, in contrast thereto, may be readily included already during the forging operation in the manufacture of forged crankshafts so that an equally good crankshaft, which is in particular equally resistant to fracture may be obtained with the usual forging operations without any increase in cost as was obtainable with the machining or milling operation used heretofore.

Accordingly, it is an object of the present invention to provide a forged crankshaft construction having relief means preventing excessive stress concentrations which may be readily manufactured during the forging operations normally followed in the manufacture of the individual crankshaft.

Another object of the present invention is the provision of depressions in the cheeks of the crankshaft having effectively the same stress-relieving effect as the so called relief pockets in the prior art crankshaft constructions and which may be readily used with forged crankshafts without entailing the disadvantages of additional manufacturing costs required by the machining or milling operations of the relief pockets used heretofore.

Still another object of the present invention resides in the provision of a forged crankshaft for internal combustion engines, especially of the multi-throw-type crankshaft which may be readily manufactured by forging, and which has characteristics at least as good as the crankshafts used heretofore and provided with relief pockets insofar as resistance to fracture and stress relief thereof is concerned.

These and other objects, features and advantages of the present invention will become more obvious from the following description when taken in connection with the accompanying drawing wherein FIGURE 1 shows a partial side view of a crankshaft construction in accordance with the present invention, and more particularly a representative crank section of a multi-throw crankshaft rough stamping; and FIGURE 2 is a partial sectional view taken substantially on the line II—II of FIGURE 1.

Referring now to the drawing, reference character $a$ designates therein four recessed portions or depressions having a partially cylindrical cross section which are provided at and extend clear across both sides of the crankshaft cheek portions $b$ in a direction essentially perpendicularly to the crankshaft axis and are located respectively above and below the adjacent main bearing pins designated by reference $c$. The endangered transition portions located within the areas $a$ are thereby rounded off with surfaces of relatively large radii of curvature by the use of the curved depressions or recessed portions $a$ whereby a relatively smooth diversion or deviation of the flow of forces takes place within the endangered regions in the crankshaft.

The depressions or recessed portions $a$ may be made during the forging operation in any suitable conventional manner. Moreover, the crankshaft itself may be provided with counterweights and may be of any suitable known construction.

While I have shown and described one embodiment in accordance with the present invention it is understood that the same is not limited thereto but is susceptible of many changes and modifications within the spirit and scope of the present invention. Thus the present invention is not limited to crankshafts for internal combustion engines but is applicable also to other shafts, for example, to crank levers provided with transition flanges or the like. Thus it may be readily seen that the present invention is in no way limited to the particular embodiment and details thereof as described and shown herein but is susceptible of many modifications in its construction and application and I, therefore, do not wish to be limited to the details disclosed herein but intend to cover all such modifications thereof as are encompassed by the scope of the appended claims.

I claim:

1. A crankshaft, especially a multi-throw forged crankshaft for internal combustion engines, comprising main bearing pin means, crank pin means, and crankshaft cheek portions connecting said crank pin means with said bearing pin means, said crankshaft cheek portions including transition portions in the regions of junction with adjacent ones of said main bearing pin means, and in the regions of junction with adjacent ones of said crank pin means, each of said transition portions consisting of a depression recessed with respect to the adjacent surface of the respective crankshaft cheek portion, said depressions extending essentially perpendicular to the crankshaft axis and being open at each end thereof, said depressions in cross section consisting essentially of an arc of relatively large radius and of relatively long arc length, said depressions being effective to reduce excessive stress concentrations within said transition portions.

2. A crankshaft, especially a multi-throw forged crankshaft for internal combustion engines, comprising main bearing pin means, crank pin means, and crankshaft cheek portions connecting said crank pin means with said bearing pin means, said crankshaft cheek portions including transition portions in regions of junction with adjacent ones of said main bearing pin means, and in regions of junction with adjacent ones of said crank pin means, each of said transition portions consisting of a depression recessed with respect to the adjacent surfaces of the respective crankshaft cheek portion, said depressions extending essentially perpendicular to the crankshaft axis and being open at each end thereof, said depressions being partially cylindrical in cross-section and consisting essentially of a circular arc of relatively large radius and of relatively long arc length, said depressions being effective to reduce excessive stress concentrations within the respective transition portion.

3. A crankshaft, comprising main bearing pin means, crank pin means, and crankshaft cheek portions connecting said crank pin means with said bearing pin means, said crankshaft cheek portions including transition portions in the regions of junction with said main bearing pin means on the one hand and with said crank pin means on the other hand, each of said transition portions consisting of a depression recessed with respect to the adjacent surfaces of the respective crankshaft cheek portion, said depressions extending essentially perpendicular to the crankshaft axis and being open at each end thereof, said depressions in cross-section consisting essentially of an arc of relatively large radius and of relatively long arc length, said depressions being effective to reduce excessive stress concentrations within the respective transition portion.

4. A crankshaft, comprising bearing pin means, crank pin means, and crankshaft cheek portions connecting said crank pin means with said bearing pin means, said crankshaft cheek portions including a transition portion in the region of junction with said bearing pin means, said transition portion being provided with a rounded off depression recessed with respect to the adjacent surface of the respective crankshaft cheek portion, said depression extending essentially perpendicular to the crankshaft axis and being open at each end thereof, said depression in cross-section consisting essentially of an arc of relatively large radius and of relatively long arc length, said depression being effective to reduce stress concentrations within said transition portion.

References Cited in the file of this patent

UNITED STATES PATENTS

| | | |
|---|---|---|
| 958,958 | Fremont | May 24, 1910 |
| 1,210,996 | Slate | Jan. 2, 1917 |
| 2,800,809 | Pike | July 30, 1957 |
| 2,876,528 | Wulpi | Mar. 10, 1959 |
| 2,888,846 | Peras | June 2, 1959 |
| 2,891,299 | Robra | June 23, 1959 |
| 2,917,946 | Fritz | Dec. 23, 1959 |

FOREIGN PATENTS

| | | |
|---|---|---|
| 221,373 | Switzerland | Aug. 17, 1942 |
| 1,144,972 | France | Apr. 29, 1957 |
| 778,504 | Great Britain | July 10, 1957 |
| 1,042,950 | Germany | Nov. 6, 1958 |